United States Patent
Sandner et al.

(10) Patent No.: US 9,312,767 B2
(45) Date of Patent: Apr. 12, 2016

(54) RECONFIGURABLE MULTIPHASE POWER STAGE FOR SWITCHED MODE CHARGERS

(71) Applicant: Infineon Technologies Austria AG, Villach (AT)

(72) Inventors: Christoph Sandner, Villach (AT); Cheow Guan Lim, Singapore (SG); Matteo Agostinelli, Villach (AT); Mark Schauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 182 days.

(21) Appl. No.: 14/099,411

(22) Filed: Dec. 6, 2013

(65) Prior Publication Data

US 2015/0162828 A1    Jun. 11, 2015

(51) Int. Cl.
*G05F 1/00* (2006.01)
*H02M 3/158* (2006.01)

(52) U.S. Cl.
CPC ............ *H02M 3/158* (2013.01); *H02M 3/1584* (2013.01)

(58) Field of Classification Search
CPC . H02M 3/1562; H02M 3/1588; H02M 3/156; H02M 3/157; G05F 1/613; G05F 3/324
USPC ......... 323/222, 223, 224, 265, 266, 271, 272, 323/282–285
See application file for complete search history.

(56) References Cited

U.S. PATENT DOCUMENTS

| | | | | |
|---|---|---|---|---|
| 6,897,641 | B1* | 5/2005 | Herbert | 323/282 |
| 9,071,138 | B2* | 6/2015 | Ngo et al. | |
| 2001/0013767 | A1* | 8/2001 | Takemoto | 320/132 |
| 2008/0303495 | A1* | 12/2008 | Wei et al. | 323/272 |
| 2009/0033293 | A1* | 2/2009 | Xing et al. | 320/164 |
| 2012/0242311 | A1* | 9/2012 | Terry et al. | 323/282 |
| 2012/0286750 | A1* | 11/2012 | Xu | 323/282 |
| 2015/0077079 | A1* | 3/2015 | Ejury | 323/282 |

OTHER PUBLICATIONS

Ferre et al., "SEG: Smart Energy Gateway for Increased Energy-Efficiency in Vehicles with Conventional Engines," Automotive Power Electronics International Conference and Exhibition, Apr. 3-4, 2013, 8 pp.

Buhlheller et al., "Technical Realization and Implementation of an Automotive DC/DC Converter Platform," Hella Energy Management, Apr. 2013, 25 pp.

(Continued)

*Primary Examiner* — Nguyen Tran
(74) *Attorney, Agent, or Firm* — Shumaker & Sieffert, P.A.

(57) ABSTRACT

Methods, devices, and integrated circuits are disclosed for providing a buck converter charger in a multiphase buck converter topology comprising at least a first phase, a second phase, and an alternative charging switch, wherein the first phase includes a first high-side switch and a first low-side switch and the second phase includes a second high-side switch and a second low-side switch. The methods, devices, and integrated circuits may control at least one phase to operate as a boost converter, control at least one phase to operate as buck converter, and close the alternative charging switch in the multiphase buck converter topology to connect an alternative charging source to a system voltage output, the alternative charging switch coupled to the first phase between the first high-side switch and the first low-side switch.

20 Claims, 7 Drawing Sheets

(56) References Cited

OTHER PUBLICATIONS

Texas Instruments Incorporated Data Sheet, "I2C Controlled 4.5A Single Cell USB/Adapter Charger With Narrow VDC Power Path Management and USB OTG," SLUSAW5A, Jan. 2012—Revised Oct. 2012, 46 pp.

S. Angkititrakul et al., "Active Inductor Current Balancing for Interleaving Mulit-Phase Buck-Boost Converter," IEEE, Applied Power Electronics Conference and Exposition, Feb. 15-19, 2009, pp. 527-532.

J. Kloetzl et al., "An Interleaved Buck-Boost-Converter Combined with a Supercapacitor-Storage for the Stabilization of Automotive Power Nets," IEEE, Vehicle Power and Propulsion Conference, Sep. 6-9, 2011, 6 pp.

P. Kosmatin et al., "High-efficiency DC/DC converter for low-voltage applications," University of Ljubljani, Electrotechnical Review, 77(2-3), pp. 109-113.

M. Omamageswari et al., "Interleaving Technique in Multiphase Buck & Boost Converter," ACEEE Int. J. on Control Systems and Instrumentation, vol. 03, No. 02, Mar. 2012, pp. 5-9.

* cited by examiner

RECONFIGURABLE MULTIPHASE POWER STAGE FOR SWITCHED MODE CHARGERS

TECHNICAL FIELD

The invention relates to electrical power chargers, and in particular, to switched mode chargers.

BACKGROUND

Many modern electronic devices, including personal digital assistants (PDAs), laptop computers, tablet computers, e-book readers, digital cameras, digital recording devices, digital media players, video gaming devices, mobile telephone handsets, cellular or satellite radio telephones, so-called "smart phones," and the like may include one or more batteries that may be used to provide power to such devices. These batteries may be rechargeable batteries, which generally need to be charged periodically.

A buck converter may be used to charge the batteries that provide power to these modern electronic devices. The buck converter is a type of step-down direct current (DC)-DC converter that has an output voltage magnitude that is less than the input voltage magnitude. The buck converter is a switch mode power supply. Some examples of a buck converter circuit topology may use two switches, e.g., a transistor and a diode along with an inductor and a capacitor. In some examples of a buck converter the current through an inductor may be controlled by the two switches (e.g., a transistor and a diode).

SUMMARY

In general, various examples of this disclosure are directed to a multiphase buck converter that may be operated in different "directions." In other words, current may flow in different directions through the multiphase buck converter circuitry as is discussed herein. Several examples using a two-phase buck converter are presented, however, it will be understood that other multiphase converter topologies are possible. In some examples, the multiphase converter may provide different charging profiles such as trickle charge, constant current, constant voltage. Some examples may provide "fast" charging, providing, for example, 5 A, 10 A, or perhaps even more. Some examples may have high efficiency to avoid thermal issues. Accordingly, switched mode charging may be used. Some examples may also provide "Universal Serial Bus (USB) On-The-Go," in which the two-phase buckconverter, or a portion of the two-phase buck converter may operate in boost mode to provide power from a battery (which may be charged using the buck mode of the two-phase buck converter) to the USB adapter. Additionally, some examples may provide a wireless charging mode using an additional input to provide charging power from a wireless power transformer.

One example is directed to a method that includes opening and closing at least one of a first low-side switch and a first high-side switch defining a first phase of a two-phase buck converter, and a second low-side switch and a second high-side switch defining a second phase of the two-phase buck converter such that the two-phase buck converter performs buck conversion of a signal, opening and closing at least one of the first low-side switch, the first high-side switch, the second low-side switch, and the second high-side switch of the two-phase buck converter such that the two-phase buck converter performs boost conversion of a signal, controlling a duty cycle of at least one of the switches in at least one of the first phase and the second phase to generate at least one of a trickle charge, a constant current, or a constant voltage, and controlling the two-phase buck converter to provide current to a system voltage output from both the first phase and the second phase to output a charging current.

Another example is directed to a two-phase buck converter including a first low-side switch and a first high-side switch defining a first phase of the two-phase buck converter, a second low-side switch and a second high-side switch defining a second phase of the two-phase buck converter, a controller configured to open and close at least one of the first low-side switch, the first high-side switch, the second low-side switch, and the second high-side switch to implement a buck mode, the controller further configured to open and close at least one of the first low-side switch, the first high-side switch, the second low-side switch, and the second high-side switch to implement a boost mode, and, the controller further configured to control the duty cycle of at least one switch in at least one of the first phase and the second phase to implement at least one of a trickle charge, a constant current, or a constant voltage, a first filter element coupled to an output of the first phase, and a second filter element coupled to an output of the second phase.

Another example is directed to an integrated circuit (IC) that includes a first low-side switch and a first high-side switch defining a first phase of a two-phase buck converter, a second low-side switch and a second high-side switch defining a second phase of the two-phase buck converter, and a controller configured to open and close at least one of the first low-side switch, the first high-side switch, the second low-side switch, and the second high-side switch to implement a buck mode, the controller further configured to open and close at least one of the first low-side switch, the first high-side switch, the second low-side switch, and the second high-side switch to implement a boost mode, and, the controller further configured to control the duty cycle of at least one switch in at least one of the first phase and the second phase to implement at least one of a trickle charge, a constant current, or a constant voltage.

The details of one or more examples are set forth in the accompanying drawings and the description below. Other features, objects, and advantages of the invention will be apparent from the description and drawings, and from the claims.

DETAILED DESCRIPTION

In general, various examples of this disclosure are directed to a two-phase buck converter that may provide different charging profiles such as trickle charge, constant current, constant voltage. Some examples may provide "fast" charging, providing, for example, 5 A, 10 A, or perhaps even more. Generally, "fast" charging may be provided by any current from 5 A to 10 A or more. Some examples may have high efficiency to avoid thermal issues. Accordingly, switched mode charging may be used. Some examples may also provide "Universal Serial Bus (USB) On-The-Go," in which the two-phase buck converter, or a portion of the two-phase buck converter may operate in boost mode to provide power from a battery (which may be charged using the buck mode of the two-phase buck converter) to the USB adapter. Additionally, some examples may provide a wireless charging mode using an additional input to provide charging power from a wireless power transformer.

Figure 1:
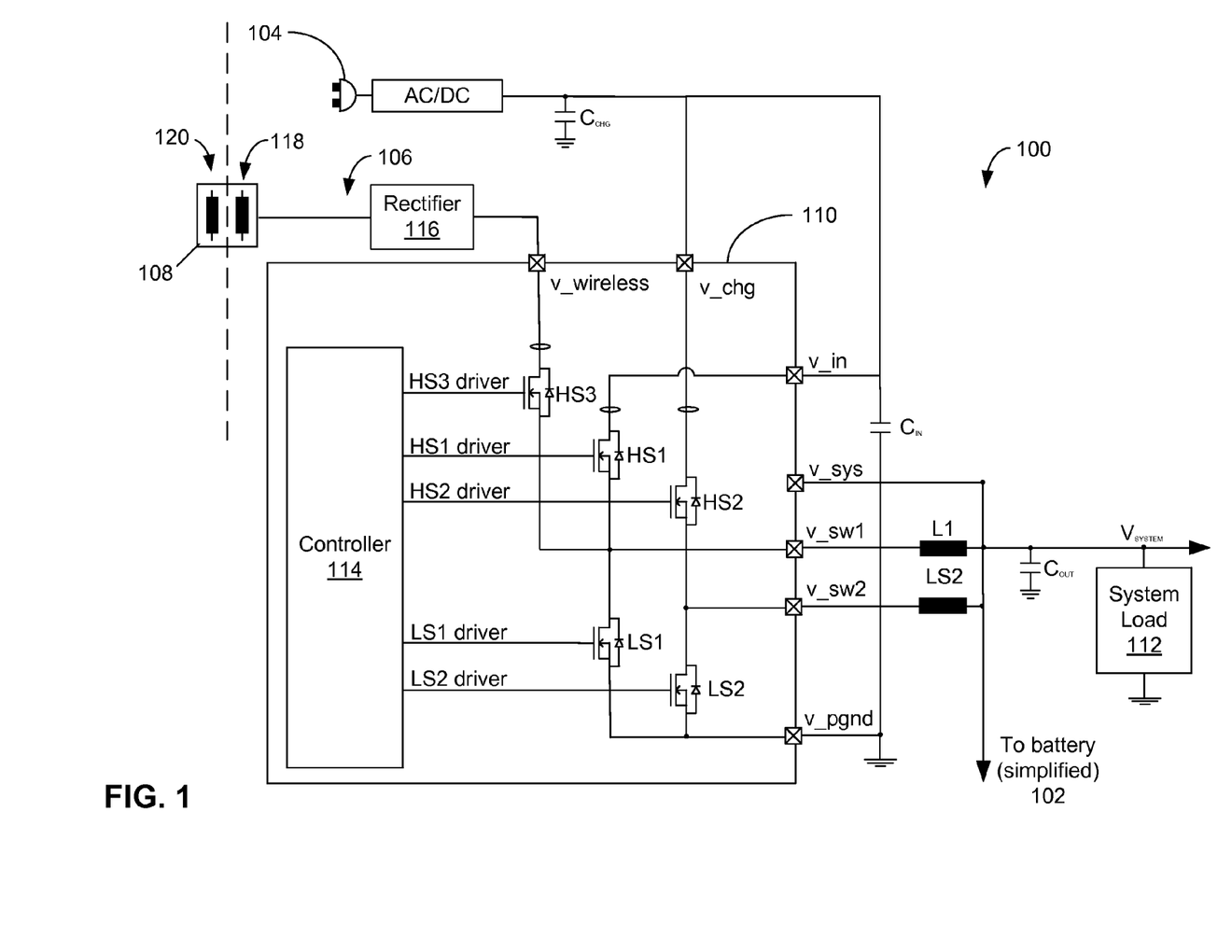
FIG. 1 is a block diagram illustrating a two-phase buck converter in accordance with an example of this disclosure.

The operation of the two-phase buck converter may be broken into the buck converter functionality and the boost converter functionality, as discussed below. In some examples, the converter might be implemented as a multiphase topology. The example described herein includes two phases. In some examples, the two phases may both operate as buck converters. In other examples, the two phases may both operate as boost converters. In yet other examples, one of the two phases may operate as a buck converter, while another one of the two phases operates as a boost converter. As illustrated in FIG. 1, a phase functioning as a boost converter may be provided power by a battery, output capacitor, or buck converter output.

A buck converter is a step-down DC-to-DC converter. In other words, an output voltage is less than its input voltage. It is a switched-mode power supply that, in some examples, may use multiple switches (e.g., transistors and diodes), an inductor, and a capacitor to reduce the voltage of a DC supply. Linear regulators, which operate by dissipating excess power as heat may be a simpler device to reduce the voltage of a DC supply, but dissipating excess power as heat is generally inefficient. Buck converters, on the other hand, may be very efficient. Some examples may be 95% efficient or even higher. Accordingly, buck converters may be useful for converting the main voltage in a computer (e.g., 12 V in a desktop, 12-24 V in a laptop) down to, for example, 0.8-1.8 V that may be needed by the processor(s) in such devices.

A boost converter is a step-up DC-to-DC converter. In other words, an output voltage is greater than its input voltage. It is a type of switched-mode power supply (SMPS). Some examples may include, for example, at least two semiconductor switches (e.g., a diode and a transistor or, in some examples, two transistors) and at least one energy storage element, e.g., a capacitor or inductor. Some examples may include multiple energy storage elements in combination, e.g., multiple capacitors, multiple inductors, a combination of a capacitor and an inductor, or a combination of multiple capacitors and multiple inductors.

Filters, which may include one or more inductors, one or more capacitors, or some combination of one or more inductors and one or more capacitors may generally be included at an output of a converter (e.g., boost converter output or buck converter output) to reduce output voltage ripple.

In some examples, circuitry may be configured to perform both a buck conversion (step-down) and a boost conversion (step-up). In other words, some circuits in accordance with examples of this disclosure relate to DC-to-DC power converter circuitry that may provide both an output voltage greater than its input voltage and an output voltage less than its input voltage. In some examples, the boost converter and the buck converter may not share the same input. For example, the buck converter maybe provided with an input voltage from a rectifier while the boost converter may be provided with an input voltage from a battery charged by the buck converter or a voltage from the buck converter itself.

Some example circuits may be reconfigurable between, buck and boost modes, while other examples may perform both modes simultaneously. In an example that performs both modes simultaneously, some power may be stepped down to lower voltages to be used by one or more devices coupled to various outputs of the power supply, while voltages from, for example, another input, may be stepped up to one or more output voltages. In such an example, the input to the boost converter may be from a battery, from an output of a buck converter, or both. The battery and the output of the buck converter may supply power to a system load.

In some examples, circuitry implementing the buck converter may include multiphase circuitry. Multiphase circuitry may be, for example, a first buck converter circuitry in parallel with a second buck converter. In various examples, elements may be shared among the first buck converter circuitry and the second buck converter circuitry. For example, an output capacitor may be shared among the different phases and may not need to be replicated for each buck converter. Additionally, the operation of the first buck converter circuitry and the second buck converter circuitry may be synchronized, with a fixed phase-shift to implement the techniques of this disclosure. Such a configuration may be referred to as a two-phase buck converter. It will be understood that additional buck converter circuitry may be added in parallel to form third, fourth, up to "n" additional phases, where "n" is any integer. The number of phases in such configurations may be limited by considerations such as the area available for such circuitry, form factor for the circuitry, or other considerations. In one example, the two-phase buck converter may include one additional phase including a third low-side switch and a third high-side switch. Additional phases may also be used including additional low-side switches and additional high-side switches.

In some examples, the multiphase buck converter may include a circuit topology that may use a series of basic buck converter circuits placed in parallel between the input and load. Each of the phases may be turned on at equally spaced intervals over the switching period. As described above, the multiphase topology may generally be used with the buck converter. In other examples, the multiphase topology may generally be used with a boost converter topology. In some examples, the phases may be reconfigurable, e.g., between a boost converter mode and buck converter mode. The circuit described herein, and illustrated in FIGS. 1-5 may provide an efficient solution to combine multiple features in terms of performance, cost, thermal budgeting (charger system efficiency), and footprint in a two-phase buck converter topology.

FIG. 1 is a block diagram illustrating a buck converter charger in the form of a two-phase buck converter 100 in accordance with an example of this disclosure. (As discussed above, several examples using a two-phase buck converter are presented, however, it will be understood that other multiphase converter topologies are possible.) The example two-phase buck converter 100 may provide different charging profiles such as trickle charge, constant current charge, and constant voltage charge. two-phase buck converter 100 may also provide for fast charging, for example, using high charge currents of up to, for example 5A, 10 A or even higher to provide a relatively quick charge to a battery in an electronic device including the a two-phase buck converter in accordance with the examples of this disclosure. In some examples, the ability to provide high charge currents may be related to the multiphase topology described herein. By splitting the current into different phases, the losses on the resistive components of the converter may be significantly reduced because the magnitude of the current may be divided by the number of phases while the power losses scale down by the square of the number of phases. This may impact thermal budgeting reasons mainly.

The multiphase synchronous buck converter portion of FIG. 1 illustrates two buck-mode phases, a first buck mode phase including switches high-side switch 1 (HS1) and low-side switch 1 (LS1), and a second buck mode phase including high-side switch 2 (HS2) and low-side switch 2 (LS2). The switches HS1, HS2, LS1, and LS2 may be transistors in some examples, such as bipolar junction transistors (BJTs), junction gate field-effect transistors (JFETs), metal-oxide-semiconductor field-effect transistors (MOSFETs), insulated gate bipolar transistors (IGBTs), or other types of transistors. MOSFETs are illustrated in FIGS. 1-5.

In some examples, the switches might be made from various materials, having semiconducting properties. In some examples, the switches (e.g., transistors, diodes) may be certain pure elements found in group IV of the periodic table such as silicon and germanium. In some examples, the switches (e.g., transistors, diodes) may be binary compounds, particularly between elements in groups III and V, such as gallium arsenide or gallium nitride, groups II and VI, groups IV and VI, and between different group IV elements, e.g. silicon carbide; as well as certain ternary compounds, oxides and alloys. In some examples, the switches (e.g., transistors, diodes) may be organic semiconductors, made of organic compounds. Additionally, in some examples, asynchronous Switched Mode Power Supply (SMPS) may be asynchronous, which means that one of the transistors is replaced by a diode. Thus, in some examples, switches HS1 and HS2 may be transistors and switches LS1 and LS2 may be diodes. Similarly to the transistors discussed above, these diodes might also be made from various materials, having semiconducting properties, e.g., silicon, germanium, gallium arsenide, gallium nitride, silicon carbide, etc. The multiphase synchronous buck converter portion of FIG. 1 may provide for efficient fast charging, for example, greater than 5 A, up to 10 A or more.

The efficiency of two-phase buck converter 100 may be high, e.g., 95% or greater, as discussed above. Using such high efficiency devices may provide for an avoidance of thermal issues, e.g., overheating, which may occur if other less efficient converter topologies were used. The systems and methods described herein may accomplish this by using switched mode charging. Additionally, in some examples the two-phase buck topology, splits the current into different phases and the losses on the resistive components of the converter may be significantly reduced, as described above. As discussed above, switched mode charging is generally much more efficient than some other types of regulators.

The example two-phase buck converter 100 of FIG. 1 may provide power from a battery (not shown, near connection 102) to, for example, a Universal Serial Bus (USB) adaptor, which may be connected in place of alternating current (AC) input 104 and the AC/DC converter. In some examples other connections for DC input power may be used, e.g., v_chg may include a connection to both AC input (and the AC/DC converter) as well as the USB adaptor. In some examples, this may be referred to as "USB On-The-Go." In some examples, two-phase buck converter 100 may provide, for example, a maximum of 7.5 W or more when operating in boost mode and providing battery power to the USB adaptor or other connector. This power may be provided at a voltage greater than the battery voltage because circuitry within two-phase buck converter 100 may increase the voltage from the battery to the output connector (e.g., USB adaptor). In an example, the boost mode may reuse one of the buck mode phases, e.g., HS1/LS1 or HS2/LS2 and configure one of the buck mode phases as a boost converter. For example, in the circuitry illustrated in FIG. 1, HS2 may be coupled to a USB adaptor.

Some examples may include circuitry for wireless charging 106. The circuitry for wireless charging 106 may include a transformer 108 connected to a rectifier 116 to provide charging power wirelessly to the two-phase buck converter 100. While transformer 108 illustrates both a first coil 118 and a second coil 120 together connected to two-phase buck converter 100, generally, transformer 108 may include the first coil 118 contained within two-phase buck converter 100 and the second coil 120 external to two-phase buck converter 100. These coils 118 and 120 are what generally provide for power transfer from, for example, an electrical outlet, and two-phase buck converter 100, which may be within an electronic device. In some examples, coil 118 may be part of a wireless power receiver of two-phase buck converter 100, which may be embedded in an electronic device (not shown). Coil 120 may be external to two-phase buck converter 100 and external to the electronic device. Coil 120 may be embedded in a charging pad (not shown) that the electronic device may be placed on for charging. When the electronic device with two-phase buck converter 100 embedded in it is placed on the charging pad the first coil 118 within the two-phase buck converter and the electronic device may be in close proximity to the second coil 120. Accordingly, the first coil 118 and the second coil 120 may form a transformer 108. Energy may flow from an energy source, e.g., an electrical power outlet, through a wire to second coil 120. Energy may then be transferred to first coil 118 wirelessly. (Each coil 118, 120 may contain many wire windings, but no wired connection is needed between the coils 118 and 120.) The dotted line between first coil 118 and second coil 120 illustrates the lack of a wired connection between the coils 118 and 120 and to demarcate that first coil 118 may be within two-phase buck converter 100 and second coil 120 may be outside of two-phase buck converter 100. Generally, when the application indicates that two-phase buck converter 100 may be within an electronic device, this may or may not include one of the coils that may form transformer 108.

Some examples may further include an alternative charging switch, high-side switch 3 (HS3) in the two-phase buck converter, the alternative charging switch coupled to the first phase between the first high-side switch and the first low-side switch, wherein the controller is further configured to control the alternative charging switch to enable and disable an alternative charging source. Accordingly, some examples may include a coil (e.g., part of transformer 108) and a rectifier 116 coupled to an alternative charging switch and configured to provide power from the coil, through rectifier 116 to the alternative charging switch HS3. In some examples, alternative charging switch HS3 may be coupled to a linear regulator.

In the illustrated example, wireless charging may be provided by reusing low side switch LS1 illustrated in FIG. 1.

Generally, high-side switch HS1 is not used in this configuration. Accordingly, this phase may be re-used instead of adding a third phase for the wireless charging. One additional HS switch, e.g., HS3, may provide an additional power connection to one of the buck mode phases, e.g., the first phase, HS1/LS1. (In the illustrated example, this may save one LS. In other words, an additional LS switch is not used for the wireless charging feature.) In the illustrated example of FIG. 1, when an alternative charging or wireless charging is used, the alternative charging switch or wireless charging switch, e.g., HS3, is generally switching in this mode When wireless charging is not being used, switch HS3 is generally off. It will also be understood that other power sources may be used in conjunction with switch HS3. In some examples, HS1 and HS2 may be connected to a pin at the top of the device top.

The circuitry for wireless charging 106 may, in some examples, provide less power than power provided through a USB adaptor when the USB adaptor is being used to provide power. The connections in the USB adaptor or other adaptor may provide power to two-phase buck converter 100 for, e.g., buck converter. As discussed above, a USB adaptor may be used to power devices external to two-phase converter 100.

The operation of the two-phase buck converter is described in more detail by breaking the discussion into two different modes of operation, (1) buck and (2) boost. Generally, the basic operation of a buck converter controls the current through an inductor by using two switches (e.g., transistors). In an idealized buck converter, which is discussed herein to generally describe the basic operation of a buck converter, all the components may be considered to be ideal. For example, switches may be considered to have zero voltage drop when on and zero current flow when off and the inductor has zero series resistance. Further, in an idealized buck converter it may be assumed that the input and output voltages do not change over the course of a cycle.

Generally, the current through an inductor does not change instantaneously. In a buck converter, beginning with a switch (HS1 or HS2) open, the current flowing from v_chg through the switch (HS1 or HS2) is 0. In other words, since the switch (HS1 or HS2) is open, no charging current flows through it.

When the switch (HS1 or HS2) is first closed, the current will begin to increase through inductor L1 when HS1 is closed and inductor L2 when HS2 is closed. At this time, if HS1 is open switch LS1 may be opened and if HS2 is open switch LS2 may be opened. Since current through an inductor (L1 and L2) cannot increase instantly, the voltage across the inductor will drop. This voltage drop counteracts the voltage of the source and therefore reduces the net voltage across system load 112 at the system voltage output, $V_{SYSTEM}$. Over time, the current through the inductor will increase slowly as the voltage drop across the inductor decreases, thereby increasing the net voltage seen by system load 112. During this time, the inductor is storing energy in the form of a magnetic field.

If the switch (HS1 or HS2) is opened before the inductor (L1 or L2) has fully charged (i.e., before it has allowed all of the current to pass through by reducing its own voltage drop to 0), then there will always be a voltage drop across it, so the net voltage seen by system load 112 will always be less than the input voltage source. In this way, the output voltage may be lower than the input voltage. Whenever the switch (HS1 or HS2) is opened, the voltage source is removed from the circuit and the current will slowly drop. Again, the current through the inductor (L1 or L2) does not change instantly. Accordingly, the voltage across the inductor (L1 or L2) will be reversed and the inductor (L1 or L2) will act as a voltage source. In the illustrated example, a current flows to the battery and system load 112 from an input voltage source through v_chg and one or more of HS1 and HS2. To maintain this current when the input voltage source is removed, the inductor (L1 or L2) will take the place of the voltage source and provide the same net voltage to system load 112 and the battery. Over time, the current through the inductor (L1 or L2) will decrease gradually and accordingly, the voltage across the inductor (L1 or L2) will also decrease. During this time, the inductor (L1 or L2) is discharging its stored energy (stored in the form of a magnetic field) into the rest of the circuit. As discussed above, when the switch (HS1 or HS2) is opened corresponding switch (LS1 or LS2) may be closed.

If the switch (HS1 or HS2) is closed again before the inductor (L1 or L2) fully discharges, system load 112 and battery will be at a non-zero voltage. A capacitor, $C_{OUT}$, placed in parallel with system load 112 may help to filter the system voltage output, $V_{SYSTEM}$, as the inductor (L1 or L2) charges and discharges in each cycle. Capacitor $C_{CHG}$ may be used to filter the charging voltage input when a USB adaptor is used as a voltage input. Conversely, capacitor $C_{CHG}$ may be used to filter an output voltage when the USB adaptor is used as a voltage output, as described herein, i.e., when HS2/LS2 is used as a boost converter circuit. Capacitor $C_{IN}$ may provide similar filtering to the input/charging voltage. For example, $C_{IN}$ may provide a filtering between input voltage, v_in, and ground, v_pgnf. As discussed above, when the switch (HS1 or HS2) is closed corresponding switch (LS1 or LS2) may be opened.

Having generally described the operation of the buck converter aspects of two-phase buck converter 100, the boost converter aspects are now described. Generally, the basic operation of a boost converter may function based on the same principle of an idealized inductor, i.e., that the current through an inductor generally does not change instantaneously. In a boost converter, the output voltage is higher than the input voltage.

When a switch (LS1 or LS2) is closed, current flows through the inductor (L1 or L2) and the inductor (L1 or L2) stores energy. When the switch (LS1 or LS2) is opened, current will be reduced because the voltage polarity on the inductor is reversed. In this phase, HS1 or HS2 is closed and voltage across the inductor is (Vin-Vout) which is negative in a Boost converter. In the on-state the voltage is simply Vin. The inductor (L1 or L2) will oppose a change or a reduction in current through the inductor (L1 or L2). Accordingly, the polarity across the inductor (L1 or L2) will be reversed. As a result, two sources, e.g., the battery and inductor (L1 or L2), will be in series causing a higher voltage to charge capacitor $C_{CHG}$ through the diode in e.g., HS1 or HS2.

If the switch (LS1 or LS2) is cycled fast enough, the inductor (L1 or L2) will not discharge fully in between charging stages, and system load 112 will always see a voltage greater than that of the input source alone when the switch is opened. ("Fast enough" will depend on the particular resistances, inductances, and capacitances of the circuitry involved.) Typical switching frequencies in some examples of these applications may be 1-3 MHz, however other frequencies are possible and will generally depend on the components used, e.g., inductors L1 and L2. In addition, while the switch (LS1 or LS2) is opened, the capacitor $C_{CHG}$ in parallel with the load on a USB adaptor is charged to this combined voltage. When the switch (LS1 or LS2) is then closed capacitor $C_{CHG}$ provides the voltage and energy to the USB adaptor. During this time, the diode in HS1 or HS2 acts as a blocking diode preventing the capacitor $C_{CHG}$ from discharging through the switch (LS1 or LS2). The switch (LS1 or LS2) may be opened again to prevent capacitor $C_{CHG}$ from discharging enough that the voltage across the capacitor $C_{CHG}$ drops more than some predetermined acceptable level, e.g., within the voltage tolerance of an electronic device connected to the USB adaptor.

In operation, a boost converter may operate in two states. The first state is an on-state wherein the switch (LS1 or LS2) is closed resulting in an increase in the inductor (L1 or L2) current. The second state is an off-state wherein the switch (LS1 or LS2) is open and the only paths offered to inductor (L1 or L2) current are through the diode in HS1 or HS2 or through the switches themselves, HS1 or HS2 to the capacitor C $C_{CHG}$ and a load, e.g., a device attached to the USB adaptor. This results in transferring the energy accumulated during the on-state into the capacitor. The current from, e.g., the battery is the same as the inductor current such that the current is not discontinuous through the inductor L1 or L2.

Controller 114 may be configured to control switches HS1, HS2, HS3, LS1, and LS2 through HS drivers and LS drivers to implement the functionality described herein. For example, controller 114 may control a switch (e.g., HS1 or HS2) such that the switch (e.g., HS1 or HS2) opens and closes as needed to implement a buck mode. The corresponding switch (LS1 or LS2) may close and open as switch (HS1 or HS2) opens and closes. Additionally, controller 114 may control the duty cycle of the switches (HS1/LS1 or HS2/LS2) to control the voltage, $V_{SYSTEM}$. When switch (HS1 or HS2) is closed, it makes a connection between v_chg and v_sw1 or v_sw2. Generally, the longer the switch (HS1 or HS2) is closed, the higher the voltage at $V_{SYSTEM}$ may be. This may vary depending on the current needed by, for example, system load 112, however. In some examples, the first phase and the second phase may be phase shifted 180°, however, other example phase shifts are possible, e.g., 0°, 90°, or any other phase shift. In an example using three phases, the phases may be shifted 120°. In an example using four phases, the phases may be shifted 90°. In an example using eight phases, the phases may be shifted 45°. Again, however, other phase shifts are possible.

In some examples, when the switch (HS1 or HS2) is open switch (LS1 or LS2) may be closed. It will be understood that switches HS1 and HS2 may be independently controllable. In some examples, HS1 may be open when HS2 is closed and HS1 may be closed when HS2 is open. Switches LS1 and LS2 may also be independently controllable. Similarly, in some examples, LS1 may be open when LS2 is closed and LS1 may be closed when LS2 is open. In buck converter operation of the first phase, the control of HS1 may be tied to LS1 so that when HS1 is open LS1 is closed and when HS1 is closed LS1 is open. In buck converter operation of the second phase, the control of HS2 may be tied to LS2 so that when HS2 is open LS2 is closed and when HS2 is closed LS2 is open.

Controller 114 may also open and close switches LS1 or LS2 to implement a boost mode as described herein. Controller 114 may also control HS1 and HS2 to implement a boost mode as described herein. The controller may be configured to allow one phase to act as a boost converter while another phase acts as a buck converter. Alternatively, both phases may act as buck converters or both phases may act as boost converters. Additionally, while two phases are illustrated in FIG. 1, in some examples, more than two phases may be implemented. For example, another circuit might include four phases. In such an example, the phases might be shifted 90°; however, again, other phase shifts are possible. two-phase buck converter 100 may be configured for low power charging by using only a single phase to charge the battery. For example, a single phase may be used to provide a trickle charging mode.

In the illustrated example of FIG. 1, a portion of the circuitry may be provided in a single chip 110. Such a chip 110 may include transistors HS1, HS2, HS3, LS1, and LS2, which may act as switches and may be controlled by controller 114, which in some examples, may be internal to chip 110. Chip 110 may include a wireless input, v_wireless, which may be used to implement wireless charging functionality, as described herein. Chip 110 may include also include a charging voltage input, v_chg, which may be used to implement an alternative charging functionality, such as using a USB adaptor or other connector as described herein. Voltage in, v_in, may be used in conjunction with a ground input, v_pgnd, such that an input capacitor, $C_{IN}$, may be used to filter the charging voltage. The system voltage, v_sys, may be used to provide an input voltage into chip 110. Two outputs, v_sw1 and v_sw2, are illustrated in the buck converter of chip 110. Note that one or more of these outputs v_sw1 and v_sw2 may be used as switching nodes of the Boost converter to one or more boost converters that may be implemented using chip 110.

While FIG. 1 illustrates the use of two inductors L1 and L2, other filtering circuitry might be used, such as for example, filtering circuitry using inductors, capacitors, or other filtering components. Additionally, in some examples, switches HS1, HS2, LS1, and LS2 may be transistors. In other examples, switches HS1, and HS2 may be transistors, while switches LS1 and LS2 may be diodes.

As illustrated in FIG. 1, a two-phase buck converter 100 includes a first low-side switch LS1 and a first high-side switch HS1 defining a first phase. The two-phase buck converter 100 further includes a second low-side switch LS2 and a second high-side switch HS2 defining a second phase. Controller 114 may be configured to open and close at least one of the first low-side switch LS1, the first high-side switch HS1, the second low-side switch LS2, and the second high-side switch HS2 to implement a buck mode. In the example illustrated in FIG. 1, controller 114 may be further configured to open and close at least one of the first low-side switch LS1, the first high-side switch HS1, the second low-side switch LS2, and the second high-side switch HS2 to implement a boost mode. Controller 114 may be further configured to control the duty cycle of at least one switch in at least one of the first phase and the second phase to implement at least one of a trickle charge, a constant current, or a constant voltage. A first filter element L1 may be coupled to an output of the first phase and a second filter element may be coupled to an output of the second phase. In some examples, the first filter element and the second filter element may be inductors.

Figure 2:
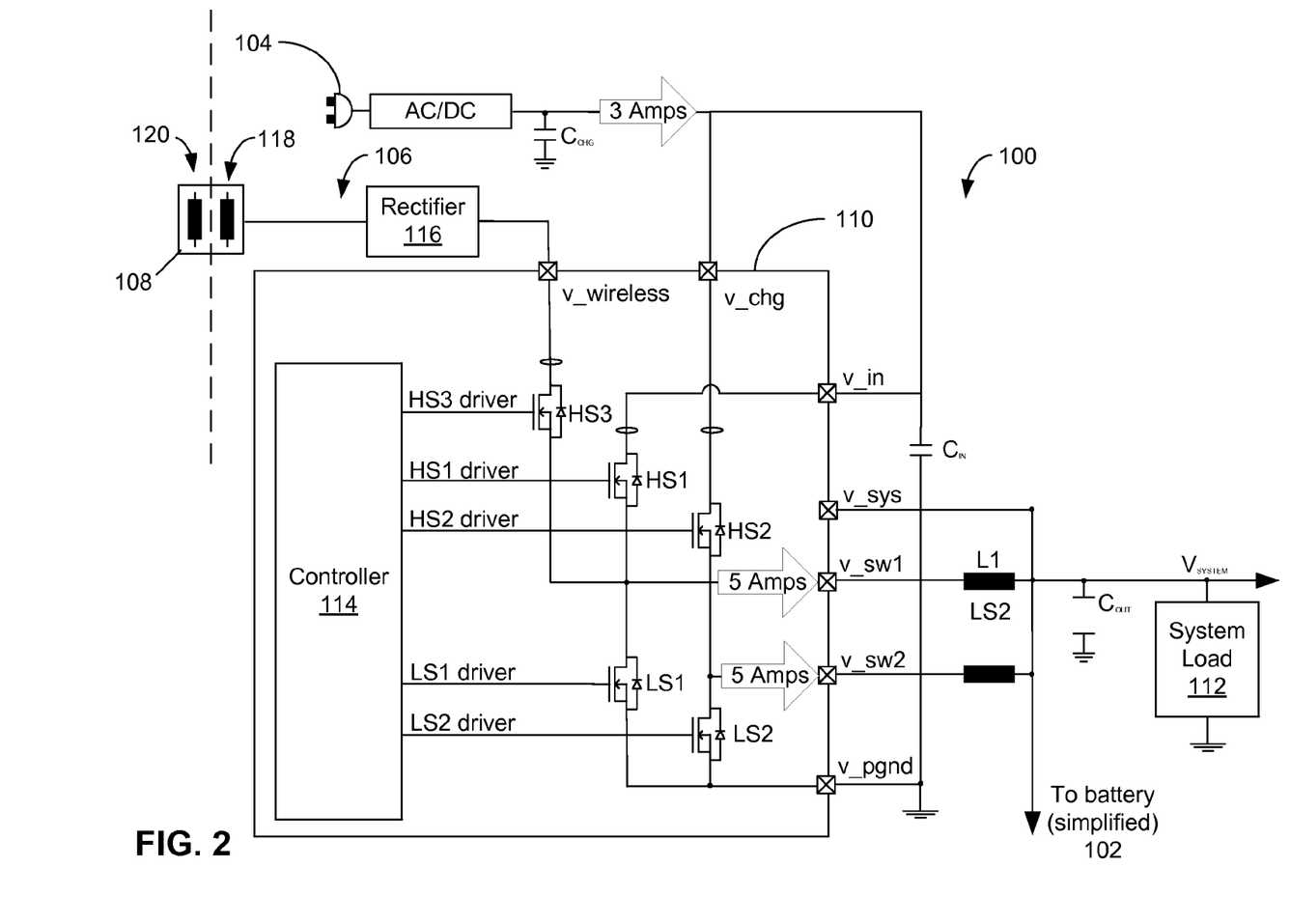
FIG. 2 is a block diagram illustrating the two-phase buck converter of FIG. 1 configured in a "fast" charging mode in accordance with an example of this disclosure.

FIG. 2 is a block diagram illustrating the two-phase buck converter 100 of FIG. 1 configured in a "fast" charging mode in accordance with an example of this disclosure. In the example of FIG. 2, both phases may be used to provide a high current for fast charging. In this example, a 10 A output is provided, 5 A through v_sw1 and 5 A through v_sw2. The duty cycle of each phase be used to set the conversion ratio of the two-phase buck converter 100, i.e. the output to input voltage ratio. In an ideal buck converter the duty cycle would be completely independent of the value of the current. Due to parasitic resistive components, however, with a higher current the duty cycle may be increased to compensate the losses and may generally be higher to provide the high current. An input of 3 A at 12 volts is provided. Note that it is generally power, rather than current that is conserved. Thirty-six watts of power is provided as an input, 12 volts times 3 A, 12 v×3 A=36 W. Assuming an ideal, 100% efficient buck converter, the voltage output for 10 A would be 3.6V, 36 W divided by 10

A, 36 W/10 A=3.6 volts. A more typical efficiency may be 95%. Accordingly, the voltage may be 5% lower, or approximately 3.42 volts.

As discussed above, the buck converter controls the current through an inductor by using two switches (e.g., transistors). Initially, in an example both switches may be open so that no charging occurs, i.e., no or very low current flows. When one switch, e.g., HS1 is first closed, the current will begin to increase through inductor L1. While HS1 is closed HS2 may be open. When HS1 is subsequently opened, HS2 may be closed and the current will begin to increase through inductor L2. Since current through an inductor (L1 and L2) cannot increase instantly, the voltage across the inductor will drop. This voltage drop counteracts the voltage of the source and therefore reduces the net voltage across system load 112, $V_{SYSTEM}$. Over time, the current through the inductor (L1 or L2) will increase as the voltage drop across the inductor decreases, thereby increasing the net voltage seen by system load 112. During this time, the inductor is storing energy in the form of a magnetic field.

Switches HS1 and HS2 may be opened before the corresponding inductors L1 and L2 have fully charged then there will always be a voltage drop across them, so the net voltage seen by system load 112 will always be less than the input voltage source (when switches HS1 and HS2 are opened before the corresponding inductors L1 and L2 have fully charged). In this way, the output voltage may be lower than the input voltage.

Since switches (HS1 or HS2) may be opened and closed alternatively to each other the voltage source is generally not removed from the circuit. Accordingly, current continues to be provided to system load 112, the battery, and $C_{OUT}$. The current in each phase may generally change as described above with respect to FIG. 1.

Figure 3:
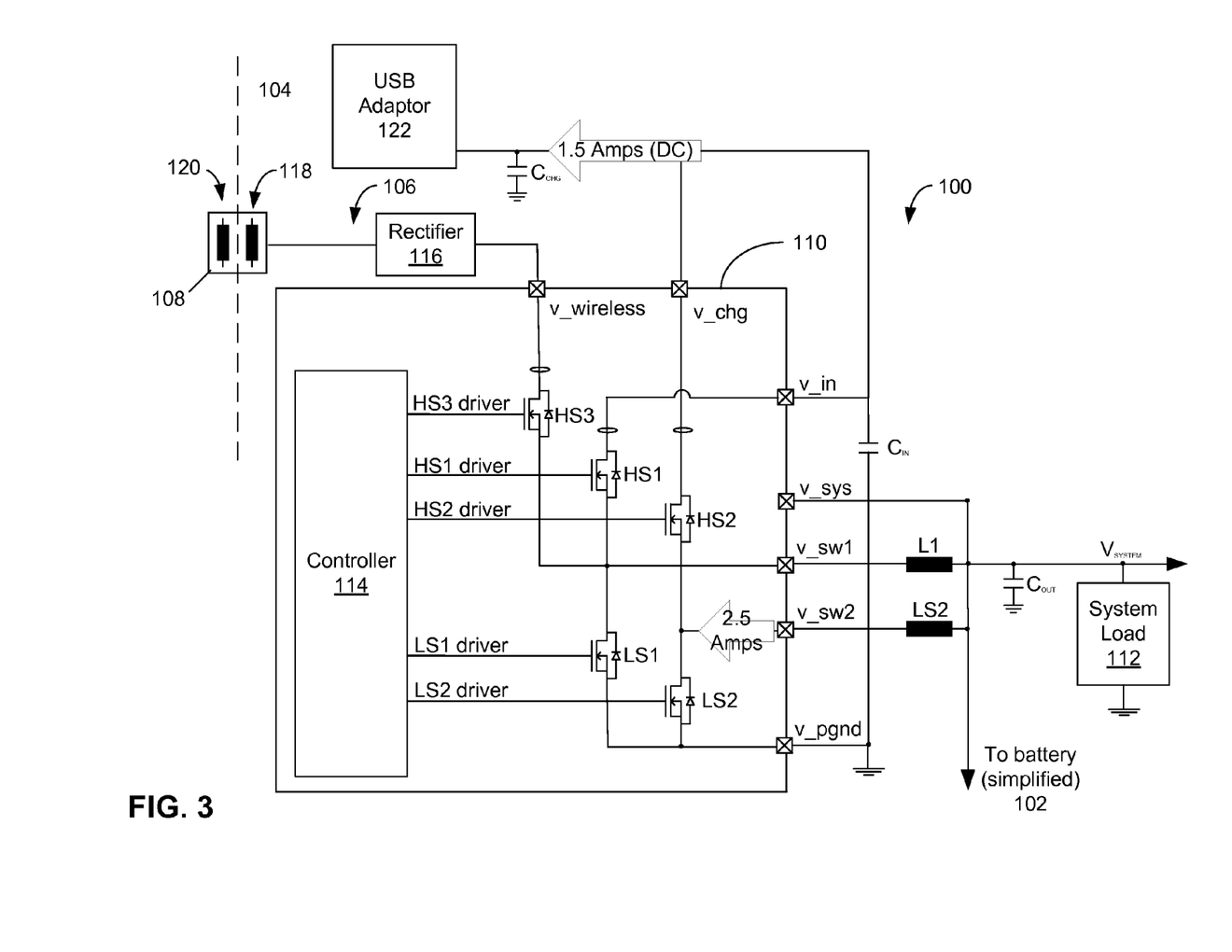
FIG. 3 is a block diagram illustrating the two-phase buck converter of FIG. 1 configured in a boost mode in accordance with an example of this disclosure.

FIG. 3 is a block diagram illustrating the two-phase buck converter 100 of FIG. 1 configured in a boost mode in accordance with an example of this disclosure. In the example of FIG. 3, boost mode is used to provide Universal Serial Bus (USB) adaptor 122 with power, which may be provided to an electronic device plugged into USB adaptor 122. For example, a boost converter of the two-phase buck converter 100 provided is coupled to a USB connector such that the boost converter provides power to the USB connector. It will be understood that, while the instant application discusses USB adaptor 122, other types of connectors may be used in other examples.

When switch LS2 is closed, current flows through the inductor L2 and the inductor L2 stores energy. When the switch LS2 is opened, current will be reduced as the impedance is higher. Accordingly, the inductor L2 will oppose a change or a reduction in current through the inductor L2. The polarity across the inductor L2 will be reversed. As a result, two sources, e.g., the battery and inductor L2, will be in series causing a higher voltage to charge capacitor $C_{CHG}$ through the diode in HS2.

If the switch LS2 is cycled fast enough, the inductor L2 will not discharge fully in between charging stages, and system load 112 will always see a voltage greater than that of the input source alone when the switch is opened. Again, "fast enough" will depend on the particular resistances, inductances, and capacitances of the circuitry involved, but in some examples may be 0.5 µs to 2 µs or other switching speeds as described herein. In addition, while the switch LS2 is opened, the capacitor $C_{CHG}$ in parallel with the load on USB adaptor 122 is charged to this combined voltage. When the switch LS2 is then closed capacitor $C_{CHG}$ provides the voltage and energy to USB adaptor 122. During this time, the diode in HS2 acts as a blocking diode to prevent the capacitor $C_{CHG}$ from discharging through the switch LS2. The switch LS2 may be opened again to prevent capacitor $C_{CHG}$ from discharging such that the voltage across the capacitor $C_{CHG}$ drops more than some predetermined acceptable level, e.g., within the voltage tolerance of an electronic device connected to USB adaptor 122.

As illustrated in FIG. 3, some circuitry from the second phase may operate in boost mode. In some examples, the first phase may operate in buck mode while the second phase is operating in boost mode. For example, wireless charging may occur on the first phase while the second phase operates in boost mode. In other examples, however, the first phase may also in boost mode. In such an example, v_wireless might not be connected to a rectifier 116 and transformer 108. A direct current power connection might be provided instead, for example.

Figure 4:
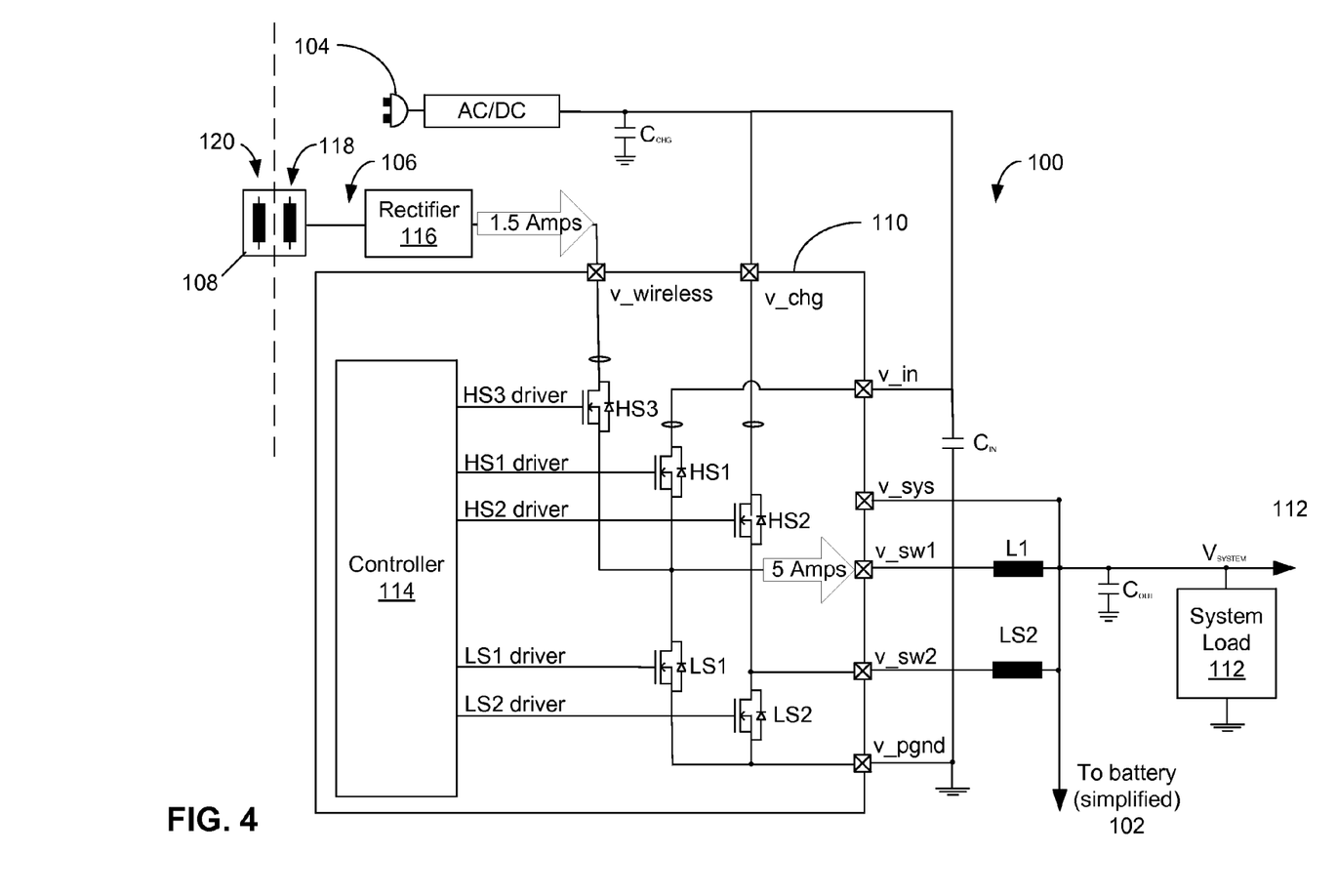
FIG. 4 is a block diagram illustrating the two-phase buck converter of FIG. 1 configured in a wireless charging mode in accordance with an example of this disclosure.

FIG. 4 is a block diagram illustrating the two-phase buck converter 100 of FIG. 1 configured in a wireless charging mode in accordance with an example of this disclosure. As illustrated in FIG. 4, 1.5 A may flow through rectifier 116 and 5 A (at a lower voltage) may flow out of v_sw1 as a charging current.

Wireless charging may be implemented by inputting power through a transformer 108. As discussed above, one coil 120 of transformer 108 may be separate from two-phase buck converter 100 and another coil 118 may be part of two-phase buck converter 100. Power from transformer 108 may flow through rectifier 116, which may convert a generally alternating current signal to a generally direct current signal, which may be input into buck converter circuitry, e.g., the first phase, of two-phase buck converter 100 through switch HS3. In the buck converter (phase 1) switch HS1 may begin open. The current flowing from v_chg through switch HS1 is 0. In other words, since switch HS1 is not closed, no charging voltage flows through it.

When switch HS1 is first closed, the current will begin to increase through inductor L1. Since current through inductor L1 cannot increase instantly, the voltage across the inductor L1 will drop. This voltage drop counteracts the voltage of the source and therefore reduces the net voltage across system load 112, battery, etc. Over time, the current through inductor L1 will increase as the voltage drop across the inductor decreases, thereby increasing the net voltage seen by system load 112. During this time, the inductor L1 is storing energy in the form of a magnetic field.

If switch HS1 is opened before inductor L1 has fully charged (i.e., before it has allowed a higher current to pass through by reducing its own voltage drop to 0), then there will always be a voltage drop across it, so the net voltage seen by system load 112 will always be less than the input voltage source. In this way, the output voltage may be lower than the input voltage. Whenever switch HS1 is opened, the voltage source is removed from the circuit and the current will slowly drop. Again, the current through inductor L1 does not change instantly. Accordingly, the voltage across inductor L1 will be reversed and inductor L1 will act as a voltage source. In the illustrated example, a current flows to the battery and system load 112 from an input voltage source through v_chg and HS1. To maintain this current when the input voltage source is removed, inductor L1 will take the place of the voltage source and provide the same net voltage to system load 112 and the battery. Over time, the current through inductor L1 will decrease and accordingly, the voltage across inductor L1 will also decrease. During this time, inductor L1 is discharging its stored energy (stored in the form of a magnetic field) into the rest of the circuit.

If switch HS1 is closed again before inductor L1 fully discharges, system load 112 and battery will be at a non-zero voltage. A capacitor, $C_{OUT}$, placed in parallel with system load 112 may help to filter the voltage as inductor L1 charges and discharges in each cycle. Capacitor $C_{CHG}$ may be used to filter the charging voltage input when USB adaptor 122 is used as a voltage input.

In the illustrated example, wireless charging uses switched mode charging. In other examples, the wireless charging switch may be connected to a linear charger instead. For example, separate linear charging circuitry might be coupled to the battery and/or system load 112.

Figure 5:
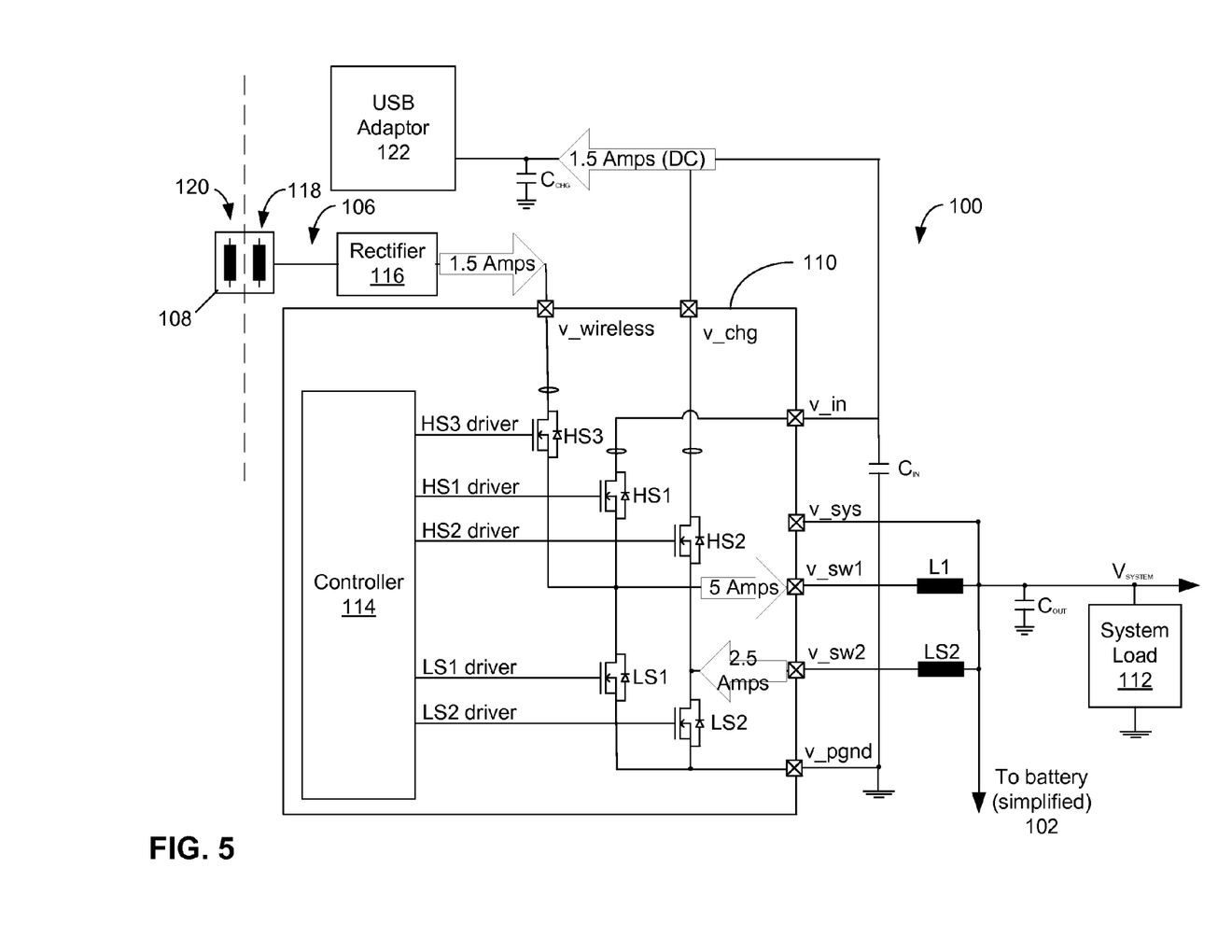
FIG. 5 is a block diagram illustrating the two-phase buck converter of FIG. 1 configured in both a boost mode and a wireless charging mode in accordance with an example of this disclosure.

FIG. 5 is a block diagram illustrating the two-phase buck converter 100 of FIG. 1 configured in both a boost mode and a wireless charging (buck) mode in accordance with an example of this disclosure. As illustrated in FIG. 5, 1.5 A may flow through rectifier 116 and 5 A (at a lower voltage) may flow out of v_sw1 as a charging current, with the first phase circuitry (HS1/LS1) functioning in a buck converter mode. As illustrated in FIG. 5, the second phase circuitry (HS2/LS2) may be configured to operate in a boost mode in accordance with an example of this disclosure as also illustrated in the example of FIG. 3. Again, boost mode may be used to provide USB adaptor 122 with power, which may be provided to an electronic device plugged into the USB adaptor 122. It will be understood that, while the instant application discusses USB adaptor 122, other types of connectors may be used in other examples.

Figure 6:
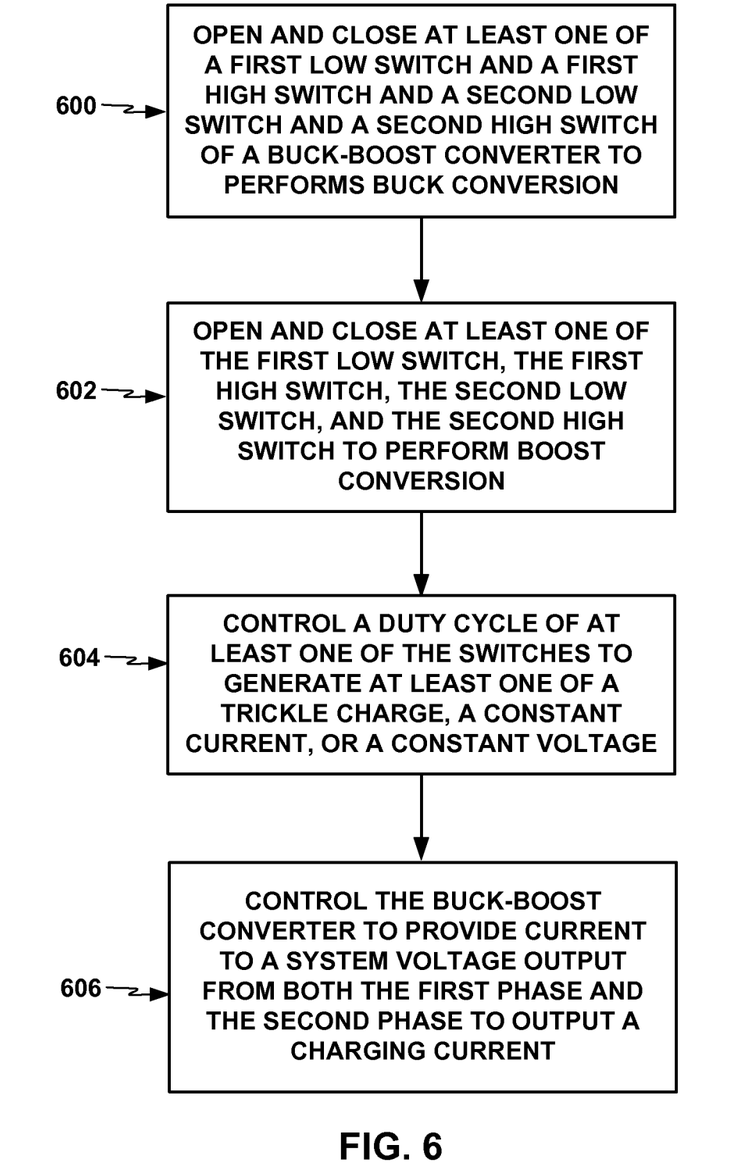
FIG. 6 is a flowchart illustrating a method for a buck converter charger in a multiphase buck converter topology, in accordance with an example of this disclosure.

FIG. 6 is a flowchart illustrating a method for a buck converter charger in a multiphase buck converter topology, in accordance with an example of this disclosure. In implementing the method a two-phase buck converter 100 may include a first low-side switch LS1 and a first high-side switch HS1 and a second low-side switch LS1 and a second high-side switch HS2 and a controller 114. In some examples, HS1, HS2, LS1, and LS2 may be transistors. The transistors BJTs, JFETs, IGFETs (MOSFETs), IGBTs, or other types of transistors. In other examples, HS1 and HS2 may be transistors and LS1 and LS2 may be diodes. HS1, HS2, LS1, and LS2 may be other types of switches in other examples. The transistors and/or diodes may be silicon, germanium, gallium arsenide, gallium nitride, silicon carbide, etc.

In the example of FIG. 6, controller 114 may open and close at least one of a first low-side switch LS1 and a first high-side switch HS1 defining a first phase of a two-phase buck converter 100, and a second low-side switch LS2 and a second high-side switch HS2 defining a second phase of the two-phase buck converter 100 such that the two-phase buck converter 100 performs buck conversion of a signal (600).

Controller 114 may open and close at least one of the first low-side switch LS1, the first high-side switch HS1, the second low-side switch LS1, and the second high-side switch HS1 of the two-phase buck converter 100 such that the two-phase buck converter 100 performs boost conversion of a signal (602). In an example, power from a battery may be used to provide power to the boost converter. Power may also be provided by a set of switches, e.g., LS1/HS1 or LS2/HS2. In other words, a phase operating as a buck converter may provide power to the boost converter. For example, one set of switches LS1/HS1, LS2/HS2 of two-phase buck converter 100 may be connected to a charging source and provide energy to one or more switches LS1, HS1, LS2, HS2 that may perform boost conversion. Note that while switches may operate in sets LS1/HS1, LS2/HS2 to perform buck conversion, this is not necessarily required.

Controller 114 may control a duty cycle of at least one of the switches LS1, HS1, LS2, or HS2 in at least one of the first phase and the second phase to generate at least one of a trickle charge, a constant current, or a constant voltage (604). For example, a single phase, e.g., LS1/HS1 or LS2/HS2 may be used to provide a trickle charging mode. In such an example, controller 114 may open and close the switches LS1/HS1 or LS2/HS2 in only a single phase since only a low current is needed. Additionally, a low duty cycle may be used, since only a low current is needed. In some examples, current output may be monitored and a duty cycle of at least one of the switches LS1, HS1, LS2, or HS2 in at least one of the first phase and the second phase may provide constant current. For example, as a load on the circuit changes current for a given output voltage may vary slightly. Accordingly, the duty cycle may be modified to increase or decrease voltage to keep the current approximately constant. For example, the circuits described herein may be used to charge a battery. As the battery is charged, the internal battery voltage may increase. The current into the battery may be the difference between the charge voltage and the internal battery voltage divided by the resistance of the battery. Accordingly, the current may decrease as the internal battery voltage increases. For a constant current charge, however, controller 114 may generally increase duty cycle to keep the current constant.

Similarly, in some examples, voltage output may be monitored and a duty cycle of at least one of the switches LS1, HS1, LS2, or HS2 in at least one of the first phase and the second phase may be controlled to provide constant voltage. For example, as current output increases, voltage may begin to drop. Accordingly, the duty cycle may be increased to compensate and keep the voltage approximately constant.

Controller 114 may control the two-phase buck converter 100 to provide current to a system voltage output from both the first phase and the second phase to output a charging current (606). This current may charge one or more batteries or battery cells. The current may provide power to a load. In some examples, the current may provide power to a boost converter, as described herein.

In some examples, the two-phase buck converter 100 provided may include an alternative charging switch HS3 in the two-phase buck converter 100. The alternative charging switch HS3 may be coupled to HS1/LS1 between the first high-side switch HS1 and the first low-side switch LS1. The controller 114 may be further configured to control the alternative charging switch HS3 to enable and disable an alternative charging source. A coil 118 (part of transformer 108) and a rectifier 116 may be coupled to the alternative charging switch and configured to provide power from the coil 118, through the rectifier 116 to the alternative charging switch. In some examples, alternative charging switch HS3 may be coupled to a linear regulator to provide not just an alternative charging source, but an alternative method of charging, i.e. linear regulator rather than a switching mode converter.

Figure 7:
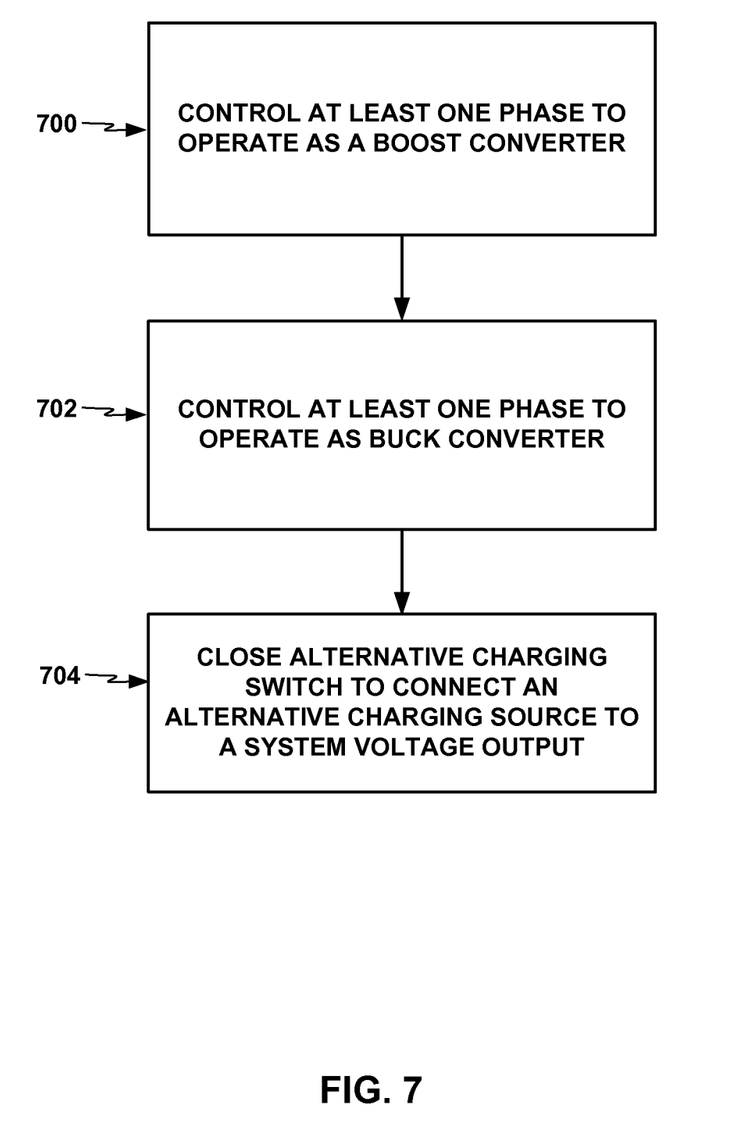
FIG. 7 is another flowchart illustrating another method of for a buck converter charger in a multiphase buck converter topology, in accordance with an example of this disclosure.

FIG. 7 is another flowchart illustrating another method of for a buck converter charger in a multiphase buck converter topology, in accordance with an example of this disclosure. In one example, a multiphase buck converter topology may include at least a first phase, a second phase, and an alternative charging switch. The first phase includes a first high-side switch HS1 and a first low-side switch LS1 and the second phase includes a second high-side switch HS2 and a second low-side switch HS2.

In the illustrated example of FIG. 7 controller 114 controls at least one phase to operate as a boost converter (700). The boost converter may operate in two states. The first state is an on-state wherein the switch (LS1 or LS2) is closed resulting in an increase in the inductor (L1 or L2) current. The second state is an off-state wherein the switch (LS1 or LS2) is open and the only paths offered to inductor (L1 or L2) current are through the diode in HS1 or HS2 or through the switches themselves, HS1 or HS2 to the capacitor C $C_{CHG}$ and a load, e.g., a device attached to the USB adaptor. This results in transferring the energy accumulated during the on-state into the capacitor. The current from, e.g., the battery is the same as the inductor current such that the current is not discontinuous through the inductor L1 or L2.

Controller 114 controls at least one phase to operate as buck converter (702). For example, controller 114 may control a switch (e.g., HS1 or HS2) such that the switch (e.g., HS1 or HS2) opens and closes as needed to implement a buck mode. The corresponding switch (LS1 or LS2) may close and open as switch (HS1 or HS2) opens and closes. Additionally, controller 114 may control the duty cycle of the switches (HS1/LS1 or HS2/LS2) to control the voltage, $V_{SYSTEM}$. When switch (HS1 or HS2) is closed, it makes a connection between v_chg and v_sw1 or v_sw2. Generally, the longer the switch (HS1 or HS2) is closed, the higher the voltage at $V_{SYSTEM}$ may be. This may vary depending on the current needed by, for example, system load 112, however. In some examples, the first phase and the second phase may be phase shifted 180°, however, other example phase shifts are possible, e.g., 0°, 90°, or any other phase shift. In an example using three phases, the phases may be shifted 120°. In an example using four phases, the phases may be shifted 90°. In an example using eight phases, the phases may be shifted 45°. Again, however, other phase shifts are possible.

In some examples, when the switch (HS1 or HS2) is open switch (LS1 or LS2) may be closed. It will be understood that switches HS1 and HS2 may be independently controllable. In some examples, HS1 may be open when HS2 is closed and HS1 may be closed when HS2 is open. Switches LS1 and LS2 may also be independently controllable. Similarly, in some examples, LS1 may be open when LS2 is closed and LS1 may be closed when LS2 is open. In buck converter operation of the first phase, the control of HS1 may be tied to LS1 so that when HS1 is open LS1 is closed and when HS1 is closed LS1 is open. In buck converter operation of the second phase, the control of HS2 may be tied to LS2 so that when HS2 is open LS2 is closed and when HS2 is closed LS2 is open.

Controller 114 closes the alternative charging switch in the multiphase buck converter topology to connect an alternative charging source to a system voltage output, the alternative charging switch coupled to the first phase between the first high-side switch and the first low-side switch (704).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various examples of the invention have been described. These and other examples are within the scope of the following claims.

The invention claimed is:

1. A method for a buck converter charger in a multiphase buck converter topology comprising at least a first phase, a second phase, and an alternative charging switch, wherein the first phase includes a first high-side switch and a first low-side switch and the second phase includes a second high-side switch and a second low-side switch, the method comprising:

controlling at least one phase to operate as a boost converter;

controlling at least one phase to operate as buck converter;

controlling a duty cycle of at least one of the at least one phase operating as the boost converter and the at least one phase operating as the buck converter to provide a first charging profile to a system voltage output;

closing the alternative charging switch in the multiphase buck converter topology to connect an alternative charging source to the system voltage output, the alternative charging switch coupled to the first phase between the first high-side switch and the first low-side switch; and controlling a duty cycle of at least one of the at least one phase operating as the boost converter and the at least one phase operating as the buck converter to provide a first charging profile to a system voltage output.

2. The method of claim 1, wherein closing the alternative charging switch couples a coil and a rectifier to the system voltage output to deliver power from the coil, through the rectifier to the alternative charging switch to implement a wireless charging mode.

3. The method of claim 2, wherein the alternative charging switch is further coupled to a linear regulator.

4. The method of claim 1, wherein a current output to the system voltage output is a constant current that is greater than 5 A.

5. The method of claim 1, wherein the first high-side switch, the second high-side switch, the first low-side switch, and the second low-side switch comprise transistors.

6. The method of claim 1, wherein the first high-side switch and the second high-side switch comprise transistors and the first low-side switch and the second low-side switch comprise diodes.

7. The method of claim 1, further comprising:

opening and closing at least one of a third low-side switch and a third high-side switch of a third phase of the multiphase buck converter topology, and a fourth low-side switch and a fourth high-side switch of a fourth phase of the multiphase buck converter topology such that the multiphase buck converter topology performs buck conversion of a signal;

opening and closing at least one of the third low-side switch, the third high-side switch, the fourth low-side switch, and the fourth high-side switch of the multiphase buck converter topology such that the multiphase buck converter topology performs boost conversion of a signal;

controlling a duty cycle of at least one of the switches in at least one of the third phase and the fourth phase to generate at least one of a trickle charge, a constant current, or a constant voltage; and controlling the multiphase buck converter topology to output current to the system voltage output from both the third phase and the fourth phase to output a charging current.

8. The method of claim 1, wherein a trickle charging mode only uses a single phase to output current to the system voltage output.

9. A multiphase buck converter comprising:

a first phase including a first high-side switch and a first low-side switch;

a second phase including a second high-side switch and a second low-side switch;

an alternative charging switch; and a controller configured to:

control at least one phase to operate as a boost converter;

control at least one phase to operate as buck converter;

control a duty cycle of at least one of the at least one phase operating as the boost converter and the at least one phase operating as the buck converter to provide a first charging profile to a system voltage output;

close the alternative charging switch in the multiphase buck converter to connect an alternative charging source to the system voltage output, the alternative charging switch coupled to the first phase between the first high-side switch and the first low-side switch; and control a duty cycle of at least one of the at least one phase operating as the boost converter and the at least one phase operating as the buck converter to provide the second charging profile to a system voltage output.

10. The multiphase buck converter of claim 9, wherein closing the alternative charging switch couples a coil and a rectifier to the system voltage output to deliver power from the coil, through the rectifier to the alternative charging switch to implement a wireless charging mode.

11. The multiphase buck converter of claim 9, wherein the alternative charging switch is further coupled to a linear regulator.

12. The multiphase buck converter of claim 9, further comprising a first filter element coupled to the system voltage output of the first phase comprising a first inductor and a second filter element coupled to the system voltage output of the second phase comprising a second inductor, wherein the first inductor and the second inductor are coupled to the system voltage output of the multiphase buck converter and the system voltage output of the multiphase buck converter is coupled to a capacitor.

13. The multiphase buck converter of claim 9, wherein a current output to the system voltage output is a constant current that is greater than 5 A.

14. The multiphase buck converter of claim 9, wherein the first high-side switch, the second high-side switch, the first low-side switch, and the second low-side switch comprise transistors.

15. The multiphase buck converter of claim 9, wherein the first high-side switch and the second high-side switch comprise transistors and the first low-side switch and the second low-side switch comprise diodes.

16. The multiphase buck converter of claim 9, further comprising at least one additional phase including a third low-side switch and a third high-side switch.

17. The multiphase buck converter of claim 9, wherein a trickle charging mode only uses a single phase to output current to the system voltage output.

18. An integrated circuit (IC) comprising:
a first phase including a first high-side switch and a first low-side switch;
a second phase including a second high-side switch and a second low-side switch;
an alternative charging switch; and
a controller configured to:
control at least one phase to operate as a boost converter;
control at least one phase to operate as buck converter;
control a duty cycle of at least one of the at least one phase operating as the boost converter and the at least one phase operating as the buck converter to provide a first charging profile to a system voltage output;
close the alternative charging switch to connect an alternative charging source to the system voltage output, the alternative charging switch coupled to the first phase between the first high-side switch and the first low-side switch; and
control a duty cycle of at least one of the at least one phase operating as the boost converter and the at least one phase operating as the buck converter to provide the second charging profile to a system voltage output.

19. The IC of claim 18, wherein closing the alternative charging switch couples a coil and a rectifier to the system voltage output to deliver power from the coil, through the rectifier to the alternative charging switch to implement a wireless charging mode.

20. The IC of claim 19, wherein the alternative charging switch is further coupled to a linear regulator.

* * * * *